United States Patent [19]

O'Brien et al.

[11] Patent Number: 5,059,763

[45] Date of Patent: Oct. 22, 1991

[54] FORMATION OF OPTICAL QUALITY SURFACES IN OPTICAL MATERIAL

[75] Inventors: Daniel R. O'Brien, Franklin; Charles H. Cox, III, Carlisle; Carlton D. Hoyt, Reading, all of Mass.

[73] Assignee: Massachusetts Institute of Technology, Cambridge, Mass.

[21] Appl. No.: 534,452

[22] Filed: Jun. 6, 1990

[51] Int. Cl.$^5$ ............................................. B23K 26/00
[52] U.S. Cl. ................................. 219/121.69; 385/49
[58] Field of Search ....................... 219/121.68, 121.69, 219/121.6, 121.85; 350/96.17

[56] References Cited

U.S. PATENT DOCUMENTS

| | | | |
|---|---|---|---|
| 4,598,039 | 7/1986 | Fischer et al. | 219/121.68 X |
| 4,659,224 | 4/1987 | Monchalin | 356/352 |
| 4,890,895 | 1/1990 | Zavracky et al. | 350/96.20 |

OTHER PUBLICATIONS

A. C. G. Nutt et al., *Opticals Letters,* vol. 9, pp. 463–465, Oct. 1984.
Barr and Stroud Limited, Abstract, University of Glasgow Dept. Electrical and Engineering, pp. 15-1-15-8.
E. J. Murphy, *Journal of Lightwave Technology,* vol. 6: pp. 862-871, Jun. 1988.
J. Watanabe and T. Saitoh, Abstracts, Fifth International, Monterey, Calif., Sep. 18-22, 1989.
B. Furch et al., *Journal of Optical Communications,* 1982, pp. 47-50.
E. Hecht, *Optics,* Second Edition Adelphi University, pp. 385-387.
Bulmer et al., Naval Research Laboratory, *Fabrication of Flip-Chip Optical Couplers Between Single-Mode Fibers and LiNBO$_3$ Channel Waveguides.*
"Conference on Lasers and Electro-Optics", Baltimore, Md., Digest of Technical Papers, pp. 191-193, Apr. 26-May 1, 1987.
M. Eyett and D. Bauerle, "Influence of the Beam Spot Size on Abiation Rates in Pulsed-Laser Processing", pp. 2054-2055, Austria, 1987.

*Primary Examiner*—C. L. Albritton
*Attorney, Agent, or Firm*—Hamilton, Brook, Smith & Reynolds

[57] ABSTRACT

A method of forming optical quality surfaces in optical material is described. In particular, high optical quality end face surfaces are provided in diffused channel waveguides formed on LiNBO$_3$ crystal material, or the like. A T-shaped trench is first formed by laser ablation. The top of the "T" bisects a plane orthogonal to and passing through the waveguide. The lower part of the "T" is centered on the longitudinal axis of the waveguide and retains an optical fiber abutting the end face. A diamond polishing wheel is inserted in the top trench to polish the end face prior to affixing the fiber optic.

24 Claims, 2 Drawing Sheets

FORMATION OF OPTICAL QUALITY SURFACES IN OPTICAL MATERIAL

GOVERNMENT SPONSORSHIP

The government has rights in this invention pursuant to Contract No. F19628-85-C-0002 awarded by the Department of the Air Force.

BACKGROUND ART

This invention relates to improvements in the formation of optical quality surface in optical material. The term "optical material" is intended to include any material which allows a useful amount of optical energy to propagate therein or therethrough. More specifically, the term is intended to cover materials which exhibit birefringence, wherein optical energy of one polarization propagates at a different speed then optical energy of a different polarization. It also includes electro-optic materials which exhibit a change in index of refraction when a voltage is applied across the material.

A typical optical material is the class of birefringent crystals, such as, lithium niobate.

Lithium niobate and other birefringent crystals have been investigated for use in a wide range of optical systems. Such crystals are used in the fabrication of electro-optic guided wave devices. These devices are used to perform various functions om optical energy, such as switching, polarizing, combining, separating, etc. This optical energy typically carries information transmitted over optical fibers.

Typical applications of optical systems using birefringent of electro-optic crystals require efficient coupling of the optical fiber to waveguide structures formed on the crystal substrate. The optical fibers typically are formed of a central core 4–6 microns in diameter surrounded by a cladding 20–120 microns in diameter; while the waveguide structure comprises a diffused dopant channel 2–5 microns in width formed on a broad surface of the crystal.

Efficient coupling of energy from the fiber to the waveguide requires reliable, accurate horizontal, vertical and angular positioning and fixation of the ned of the fiber to an optically quality surface at the face end of the waveguide. Various techniques for accomplishing this coupling have been tried over the years with varying degrees of success.

The chemically inert nature of most birefringent crystals greatly complicates the coupling problem. A suitable etchant has not been found for lithium niobate, which removes crystal material adjacent the waveguide end face in a rapid and precise manner to form a support structure for maintaining the optical fiber in a fixed positioned abutting the end face. In particular, lithium niobate and other like materials are highly resistant to chemical or plasma etching.

Reactive ion etching (RIE) has been used to ion mill grooves (in birefringent crystals) to create microstructures. [See "Fiber-to-Waveguide Coupling Using Ion-Milled Grooves in Lithium Niobate at 1.3-$\mu$m Wavelength", *Optics Letters*, Vol. 9, No. 10, (1984) and "Performance of Integrated Optical Frequency Shifters Pigtailed to High Benefringence Fibers Using Ion-Milled Grooves" by Andovic et al., *Guided Optical Structures in the Military Environment*, pp. 15/1–8, May 1986] The constraints of vacuum processing along with the limited amount of kinetic energy which can be generated for RIE have left this technique in the laboratory environment. The ablation rate achieved by reactive ion etching is of the magnitude of 3 $\mu$m/hour which shows the considerable amount of time it would take to fabricate a groove of any significant depth. It is also difficult to obtain repeatable, smooth vertical walls which will yield acceptable optical surfaces. Any surface irregularity which occurs will cause optical scattering, a significant factor when trying to minimize loss. Material redeposition is also difficult to control, thus limiting the depth of the channel.

Those skilled in the art have attempted to circumvent by resorting to so-called "flip-chip" coupling using an etchable substrate fixture. In "flip-chip" coupling, a chip of birefringent crystal with a channel waveguide formed thereon is flipped over onto a readily etchable substrate, such as a silicon substrate. Preferentially etched grooves in the silicon substrate provide fiber positioning and alignment marking for accurate fiber to channel waveguide alignment. [See "Fabrication of Flip-Chip Optical Couples Between Single-Mode Fibers and LiNbO$_3$ Channel Waveguides", Bulmer et al., *Proceedings Electron Components Conference* 31st, IEEE (1981)]

The substrate fixture introduces an added complexity to the problem, in that the silicon substrate is a third component which as to be thermally matched and bonded with the fiber and the crystal, per se.

Lithium niobate expands anistropically in three axis compounding the problem of bonding the Si to the LiNbO$_3$. Currently, an optical cement is used having polymers with 10 to 20 times higher thermal expansion than LiNbO$_3$.

SUMMARY OF THE INVENTION

The invention broadly comprises a method and resulting structure for forming optical quality surfaces in devices formed of optical material. First, the location of a shaped pattern is formed on the surface of the device. Next, material within the defined location is ablated using electromagnetic radiation energy to remove the material and form a predetermined shape such as a groove or trench within the body of the device.

An appropriately shaped polishing tool is used to polish at least one of the surfaces of this shape to a sufficiently high degree of optical quality.

In a more specific application, we have found that laser ablation of optical material coupled with polishing of the ablated material provides a solution to the coupling of optical fibers to channel waveguides formed on the optical material. Laser ablation alone is unsatisfactory. The ablative process leaves behind a residue of redeposited material or "slag". This "slag" material may be removed by ultrasonic cleaning. But, the ablative process deteriorates the optical quality of the material and is not acceptable as an optical quality surface for coupling the optical fiber with the channel waveguide.

To overcome this problem, in accordance with a preferred embodiment of the invention, a T-shaped trench is formed in the crystal substrate by laser ablation. The top of the "T" extends orthogonal to, and is centered on and abuts the end face of the channel waveguide. The fiber retaining trench extends along a longitudinal axis aligned with the longitudinal axis of the channel waveguide and forms the remainder of the T-shaped trench or groove.

The orthogonal trench at the top of the T permits the introduction of a rotary polishing wheel into the trench to polish the side wall and end face to produce a high optical quality planar optical surface at the high end face.

DETAILED DESCRIPTION OF THE INVENTION

Figure 1:
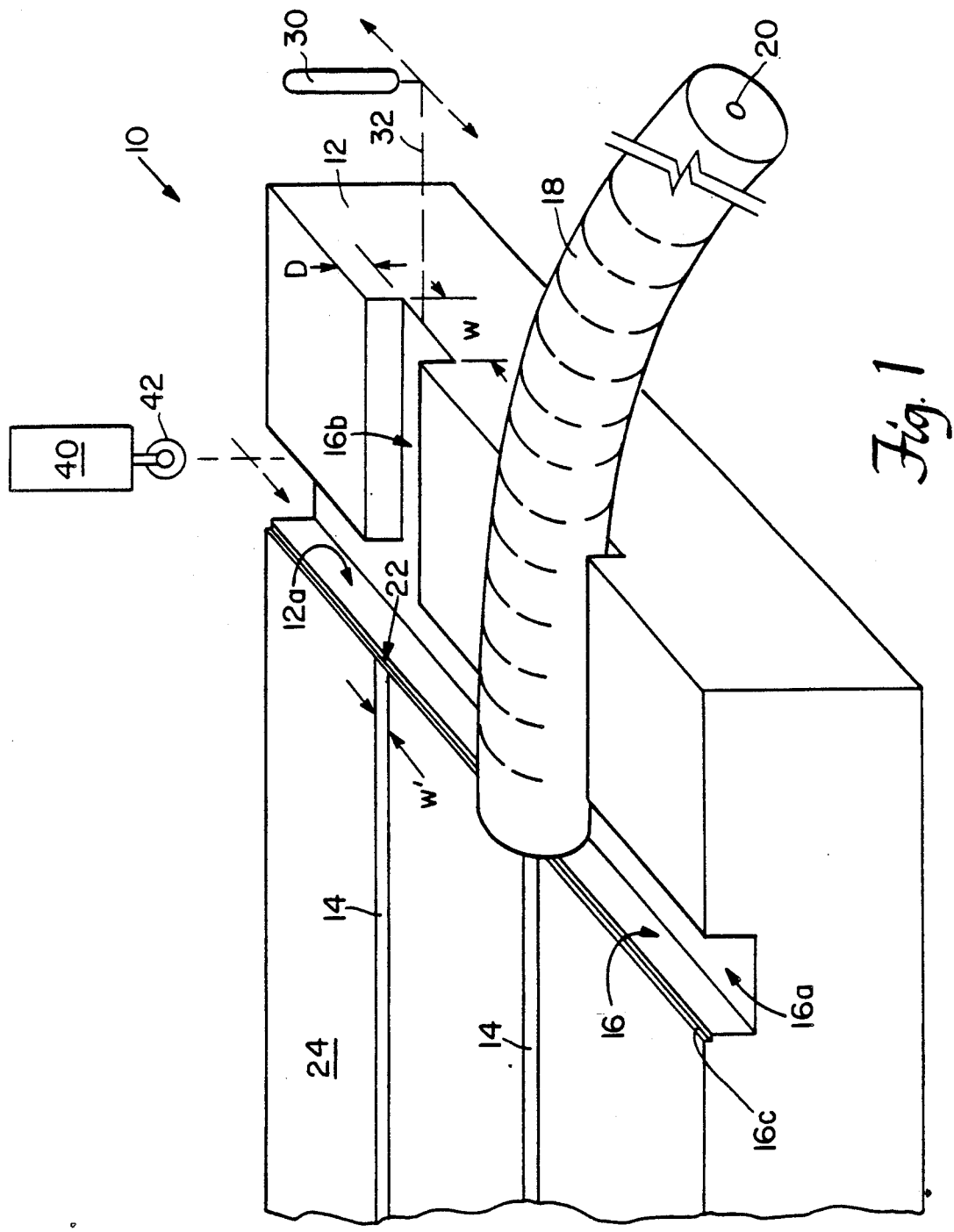
FIG. 1 is a partially exploded perspective view of an optical device fabricated in accordance with the invention.
Figure 2:
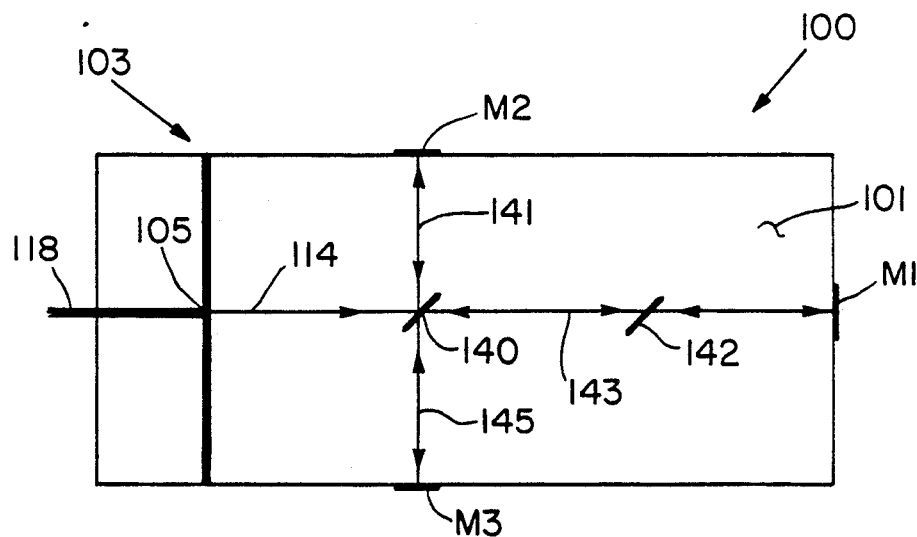
FIG. 2 is a schematic of a Michelson Interferometer made in accordance with the invention.
Figure 3:
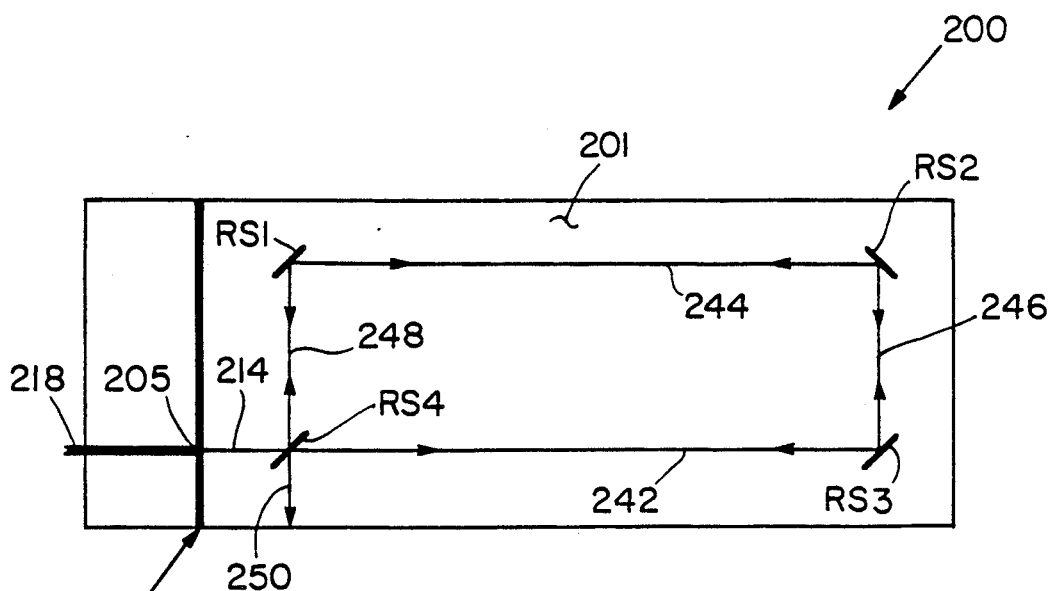
FIG. 3 is a schematic of a Sagnac Interferometer made in accordance with the invention.

Referring now to FIGS. 1–3, the invention will now be described, in detail, in connection with a lithium niobate crystal, since this material has heretofore been found to present numerous obstacles to coupling of optical fibers thereto. As shown in FIG. 1, an optical device 10 is formed of a lithium niobate crystal substrate 12 with a titanium diffused channel waveguide 14 extending longitudinally along a major surface 24 of the crystal substrate.

A "T"-shaped trench or groove 16 is defined in the substrate by laser ablation. This T-shape is visually aligned and defined by the laser operator after the waveguide 14 has been formed on the surface 24. The top of the "T" 16a is located perpendicular to the channel waveguide 14 and overlaps the waveguide so that when the "T" is ablated, an end face 22 is formed in the channel waveguide 14.

The lower part 16b of the "T" is centered on the channel waveguide 14 and extends along the same longitudinal axis.

A focused beam 32 from an 8 watts average power Q-switched Nd; YAG 1.06 micron laser 30 is used to provided electromagnetic energy to the T-patterned substrate to form the T-shaped trench 16. Trench 16 has a width W of about 130 microns and a depth D of at least one-half the height of the fiber 18, i.e. typically about 65 microns. These dimensions are suitable for retaining an optical fiber 18 in the lower part 16b of the trench in a fixed position, such that the core 20 is aligned with the end face 22 of waveguide 14.

The trench 16 is formed by scanning the laser beam along the pattern at a rate of about 100 mm/sec at a 4 KHz pulse repetition rate and an optimum power level of 12 Kilowatts peak power and a 100 nanosecond pulse width yielding 1.2 to 1.5 millijoules per pulse.

The repetition rate was varied from 0.4 KHz to 10 KHz yielding a linear variation in the depth of the grooves 16 in the ablated regions. Increasing the repetition rate resulted in increased ablation until undesired damage resulted.

After ablation, a triangular cross-sectional trench structure representative of the crystalline rhombohedral structure can be seen under a high power microscope, with an accumulation of "slag" at the bottom. The resulting end face 22 is of poor optical quality and unsuitable for launching optical energy from fiber 18 into waveguide 14.

Accordingly, this surface 22 is polished using the orthogonal trench 16a as an access groove for a polishing tool 40. Polishing tool 40 consists of a dicing saw with 5.0 micron diamond particles resin bonded to a 50 micron wide blade or wheel 42, to emulate a polishing wheel. Other blade widths are possible. The tool has continuous water flow during operation for lubrication and temperature control. The blade rotates at 30,000 RPM with a 0.7 mm blade exposure and an infeed rate ranging from 0.3 to 0.15 mm/sec or less.

When mounting a blade, determining blade exposure is critical. The blade may flex in rotation causing fractures to occur, if there is too much exposure. A diamond abrasive resin bonded blade was used for lithium niobate. Resinoid blades are superior to metal bonded types for cutting difficult materials. The blade's ability to wear away is a self-sharpening mechanism. The bond finish is soft and the surface does not receive hard impact from the contact with the abrasives, thus giving a finer finish and less chipping.

The basic difference between grinding and polishing is that grinding uses a fixed abrasive, while polishing uses loose abrasives. The key to achieving a good optical quality surface is to maintain operation in the ductile regime of the material. A certain threshold is required before fracture occurs. Below this fracture threshold plastic yielding will be the predominant mechanism. For harder materials brittle fracture is the predominant working mechanism for faster infeed rates. Below this threshold the energy required to generate chipping is larger than the energy required for plastic yielding. This threshold can be maintained by keeping the infeed rate low.

The laser ablated channel 16a permits the removed material to follow a path of least resistance keeping the exfoliated material from interacting with the polished surfaces. The polishing tool 40 is a rigid structure; the thin resinoid blade 42 reduces the abrasive forces and allows for compliancy and the even distribution of forces acting on the specimen.

The blade 42 was passed along the ablated surface with a velocity of 0.3 mm/sec, or less, to insure a good polish for the blade used. Above 0.3 mm/sec the material began to fracture. A face surface 22 was polished with multiple passes of the blade, which intruded further in the channel with each pass. The exact polishing parameters (blade velocity, grit and progression), depend on the desired surface finish.

A fiber stop or shelf 16c may be provided by further polishing the substrate wall 12a along the upper surface thereof to a depth of 2 microns where the waveguide end walls 22 are located. This indentation of the end wall prevents contact with the waveguide transmitting surface when the fiber 18 is butted against the crystal substrate 12, but still allows efficient optical coupling between the fiber and the waveguide. The lithium niobate sample had a 130 micron wide (W) dimension by 65 micron deep (D) dimension channel profile and the sidewall 22 was polished in less than 50 minutes. This method can be automated for increased production while being effective for finishing edge surfaces of various optical materials.

By using the combination steps of alser ablated trench openings with polishing of the end-face, it is possible to form a number of optical integrated circuits, as well as reflective mirror cavity facets for surface-emitting lasers in materials other than lithium niobate. For example, III-V-type semiconductor materials, including GaAs, or other optical materials, such as barium titanate, strontium barium niobate ($SrBaNbO_3$) and lithium tantalate ($LiTaO_3$) may also be ablated and polished in accordance with the invention.

Alternate geometries can be fabricated with the substitution of different polishing mechanisms. Subminiature dremmels can be used to polish different geometries created during laser ablation. These geometries can be used to generate geodesic components. A profile can be generated to connect specific input and output rays. Any path bending geometry can be generated during ablation. The correctly designed resilient polishing tool can then be used to polish the desired surface.

One example of an alternate structure is the Michelson interferometer shown schematically in FIG. 2. An interferometer structure 100 is formed on, or in, a substrate 101 formed of a suitable optical material, such as lithium niobate. A T-shaped structure 103 is formed, as described in FIG. 1, by laser ablation followed by polishing. A primary waveguide leg 114 of the interferometer leads from the central polished mirror surface 105 to a beam splitter 140 where a traveling light wave from fiber 118 is divided into two separate waves. Leg 114 and other waveguide legs are formed on the substrate surface by well known deposition techniques. One beam segment is deflected by beam splitter 140 and travels along waveguide leg 141 to a mirrored surface (M2) and the other passes through the beam splitter 140 and travels along waveguide leg 143 to a mirrored surface (M1) where it is, in turn, reflected back to the beam splitter 140. Part of the wave coming from M2 passes through beam splitter 140 exiting the device along leg 145 and out surface M3 and part of the wave coming from M1 is deflected by the beam splitter 140 to leg 145 and to also exit the device at surface M3. The two waves are united at leg 145 and interference can be expected. Notice that one beam passes through the beam splitter three times and the other passes through only once. A compensator plate 142 with thickness identical to the beam splitter 140 is inserted in the waveguide leg 143 between beam splitter 140 and mirror M1. The compensator acts as an exact duplicate of the original beam splitter 140 with the exception of any coating on the original beam splitter.

Another amplitude splitting interferometer is the Sagnac interferometer shown in FIG. 3. FIG. 3 shows an offset T-shaped fiber optic coupling channel 203 formed (as in FIG. 1) in a suitable optical substrate 201. An optical fiber 218 couples light to polished end face 205 where it is propagated as a travelling wave along waveguide 214 to beam splitter RS4.

A first portion of the light beam travels from splitter RS4 along waveguide path 248 to 45° angle mirror RS1 and is reflected to 45° angle mirror RS2 along waveguide path 244; and from there along leg 246 to reflector RS3; and from there along leg 242 to beam splitter RS4 where a portion is transmitted along leg 250 and exits the device at leg 250.

A second portion of the light beam entering beam splitter RS4 travels in the same loop in the opposite direction and also exits at leg 250.

The main feature of the Sagnac device is that there are two identical but opposing paths taken by light passing through different portions of the beam travelling in interferometer 200. Both paths form closed loops before the beams are united at RS4 to produce interference. A shift in the orientation of one of the mirrors will produce a path length difference leading to a resulting fringe pattern. This Sagnac configuration can be used to measure the rotational speed of a system. The rotation effectively shortens one path length of the system in comparison to the other. The resulting fringe pattern is directly proportional to the angular speed of rotation.

The 45° reflection surfaces RS1, RS2 and RS3, as well as the beam splitter surfaces, can each be made as previously described, by laser ablation of the substrate at the desired location followed by insertion of a polishing tool in the ablated volume to polish a surface to mirror-like quality.

In each of the above cases, the laser ablation system allows the fabrication of different interferometer configurations. Conventional electro-optic devices are limited to a single pass Mach Zehnder interferometer because presently there is no known commercially practicable method of forming reflective surfaces in material such as lithium niobate. With the aid of this new method one can generate multi pass interferometers such as Michelson, Sagnac and Fabrey Perot. As noted above, optical quality reflecting surface beam splitters can be generated in an optical crystal to be placed in the optical path for the creation of the interferometer geometry. This process will therefore enable generation of practical miniaturized interferometers.

The apparatus and method of the invention has at least the following advantages: (1) the process is independent of crystal orientation; (2) a wide variety of geometrics can be created; (3) the processing time is much quicker than previous techniques; and (4) the process preserves edge surface orthogonality.

EQUIVALENTS

Those skilled in the art will know, or be able to ascertain using no more than routine experimentation, many equivalents to the specific embodiments of the invention described herein.

These and all other equivalents are intended to be encompassed by the following claims.

We claim:

1. A method of forming optical quality surfaces in a device formed of optical material comprising the steps of:
    a) ablating the material at a predetermined location using electromagnetic radiation to remove material and form a first depression therein;
    b) utilizing the depression so formed as an access opening for a polishing tool; and polishing at least a portion of a surface in the depression until it is of sufficiently high optical quality.

2. The method of claim 1 wherein a second depression is formed orthogonal to said first depression.

3. The method of claim 2 wherein the second depression is so dimensioned in width and depth as to retain an optical fiber in fixed optical energy coupling relationship with a waveguide region on, or in, said device.

4. The method of claim 1 wherein the material is an electro-optical material.

5. The method of claim 1 wherein the material is a birefringent material.

6. The method of claim 1 wherein the material is selected from the group consisting of $LiNbO_3$, $SrBaNbO_3$ and $LaTaO_3$.

7. The method of claim 1 wherein the radiation is provided by a laser.

8. A method of forming an optical quality end face surface on a channel waveguide formed on an optical quality material substrate comprising the steps of:
    a) ablating the substrate to define first and second mutually orthogonal trenches such that the first trench is located perpendicular to a plane passing through said end face surface, while the second trench is located along a longitudinal axis passing through the center of said channel waveguide;

b) utilizing the first trench as an access for a polishing tool, polishing said end face surface until it is of sufficient optical quality.

9. The method of claim 8 including fixing an optical fiber in said second trench with an end of said fiber abutting said end face.

10. The method of claim 9 wherein the depth of the second trench is equal to one-half the diameter of the fiber.

11. The method of claim 8 wherein the material is selected from the group consisting of LiNbO$_3$, SrBaNbO$_3$ and LaTaO$_3$.

12. The method of claim 8 wherein the polishing tool comprises a rotating wheel with diamond grit on the wheel.

13. The method of claim 8 wherein the radiation is provided by a laser.

14. The method of claim 9 further including polishing a surface of said second trench to form a stop such that a clearance space is provided between the end face and the abutting fiber to avoid damaging the end face.

15. The method of claim 3 further including polishing a surface of said second depression to form a stop such that a clearance space is provided between the optical fiber and the waveguide region.

16. A method of forming an optical quality end face surface on waveguides formed on lithium niobate substrates comprising the steps of:

a) ablating the substrate material at a location opposite said end face surface using electromagnetic radiation to remove material and form a depression; and b) utilizing the depression so formed as an access opening for a polishing tool and polishing said end face surface until it is of sufficiently high optical quality.

17. The method of claim 16 wherein a second depression is formed orthogonal to said first depression.

18. The method of claim 17 wherein the second depression is so dimensioned in width and depth as to retain an optical fiber in fixed optical energy coupling relationship with said waveguide.

19. The method of claim 16 wherein the radiation is provided by a laser.

20. A method of forming an optical quality end face surface on a channel waveguide formed on lithium niobate substrate comprising the steps of:

a) ablating first and second mutually orthogonal trenches such that the first trench is located perpendicular to a plane passing through said end face surface, while the second trench is centrally located along a longitudinal axis passing through the center of said channel waveguide;

b) utilizing the first trench as an access for a polishing tool, polishing said end face surface until it is of sufficient optical quality.

21. The method of claim 20 including fixing an optical fiber in said second trench with an end of said fiber abutting said end face.

22. The method of claim 21 wherein laser radiation is used to provide power for the ablation.

23. The method of claim 22 wherein the laser is a Q-switched Neodimium YAG laser and is operated at a pulse repetition rate of about 3 to 4 kilohertz with about a 100 nanosecond pulse width.

24. The method of forming a groove for holding an optical fiber in a substrate opposite an end face of a waveguide structure formed on, or in, the substrate comprising the steps of:

a) laser ablating the groove opposite the waveguide structure; and b) polishing the end face with a rotating polishing wheel disposed within said groove.

* * * * *